April 30, 1946. R. B. RANSOM 2,399,293
CONSTANT VELOCITY JOINT
Filed July 8, 1943
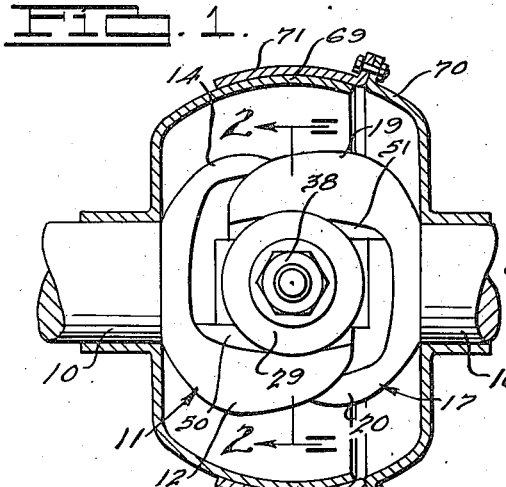
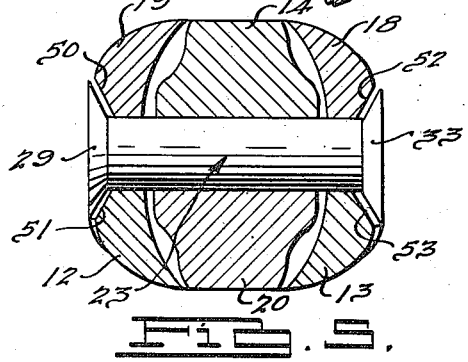
INVENTOR.
Richard B. Ransom.
BY
Harness, Dickey & Pierce.

Patented Apr. 30, 1946

2,399,293

UNITED STATES PATENT OFFICE 2,399,293

CONSTANT VELOCITY JOINT

Richard B. Ransom, Knoxville, Tenn., assignor to Universal Products Company Incorporated, Dearborn, Mich., a corporation of Delaware Application July 8, 1943, Serial No. 493,873

4 Claims. (Cl. 64—21)

The invention relates to universal joints and it has particular relation to a universal joint of constant velocity character. In certain respects, the invention constitutes an improvement over that embodied in my copending application for patent, Serial No. 480,490, filed March 25, 1943.

One object of the present invention is to provide an improved type of constant velocity universal joint wherein torque loads are imparted from one shaft to another through the use of an intermediate or connecting member in the form of a single pin or trunnion element extending diametrically through the joint center.

Another object of the invention is to provide a universal point of constant velocity character which is simple and wherein very few parts are required.

Other objects of the invention will become apparent from the following specification, the drawing relating thereto, and from the claims hereinafter set forth.

For a better understanding of the invention, reference may be had to the accompanying drawing, wherein:

Figure 1 is a side elevational view of a universal joint constructed according to one form of the invention;

Figure 2 is a cross-sectional view taken substantially along the line 2—2 of Figure 1;

Figure 3 is a plan view of the structure shown by Figure 1;

Figure 4 is a geometrical diagram illustrating the manner in which constant velocity action is obtained; and Figure 5 is a view on the order of Figure 2, illustrating another form of the invention.

Referring to Figures 1 and 2, a shaft element 10 is shown and this element has a three-arm yoke element thereon with the arms indicated at 12, 13, and 14. A second shaft element 16 also has a three-arm yoke element 17 and the arms of this element are indicated at 18, 19, and 20. All of the arms are disposed in circumferentially alternating relation and are sufficiently separated one from another to permit normal joint operation.

An intermediate or connecting member comprises a pin 23 having reduced end portions 24 and 25 which receive rollers 26 and 27. The roller 26 includes an inner cylindrical portion 28 and a frusto-conical outer portion 29, and the roller 27 similarly includes a cylindrical inner portion 32 and a frusto-conical outer portion 33. For holding the rollers in position, collars 34 and 35 may be provided on the reduced portions 24 and 25 of the pin and the ends of the pin are threaded and have retaining nuts 37 and 38 for holding the parts together. This arrangement enables locating the rollers accurately in position so that the distance between the rollers along the pin axis may be definitely fixed while allowing the rollers to rotate or turn when necessary.

At the lower side of the structure as seen in Figure 2, the arms 12 and 13 of yoke element 11 have aligned flat surfaces 40 and 41, respectively, which substantially have line contact with the cylindrical portions 28 and 32 of the rollers. At the upper side of the pin, the third yoke arm 14 on yoke element 11 has a long flat surface 43 which substantially has line contact with the upper side of the pin between the cylindrical portions 28 and 32 of the rollers. It will be noted that this third arm has a substantially long line of contact and that this line of contact extends substantially on each side of the axial center of the pin. If the yoke element 11 is turned clockwise as seen in Figure 2, the surface 40 on arm 12 will drive arm 19 through the roller 26 and that portion of the surface 43 on arm 14 to the right of the pin center will drive arm 20 through the pin. These two lines of contact thus will impart motion to the pin in the clockwise direction. If the element 11 is turned counterclockwise, the surface 41 on arm 13 will drive arm 18 through roller 27 while that portion of surface 43 on arm 14 to the left of the pin center will drive arm 20 through the left side of the pin.

Arms 18 and 19 on element 17 similarly have flat surfaces 45 and 46 substantially contacting the cylindrical portions 28 and 32 of the rollers at the upper side of the pin, while the third arm 20 has a long flat surface 47 substantially contacting the pin oppositely to the surface 43 on arm 14. If the shaft element 17 is turning counterclockwise as seen in Figure 2, rotation of the shaft element 11 is effected through engagement of the same surfaces as when shaft element 11 is turning clockwise, but the movements will be reversed. If the shaft element 17 is driving clockwise, arm 18 drives arm 13 through roller 27 while the left side of arm 20 drives the left side of arm 14 through the pin.

In order to obtain constant velocity, the arms 12 and 19, respectively, have surfaces 50 and 51 adapted to contact the under side of the frusto-conical portion 29 of roller 26. These surfaces 50 and 51 are inclined to the pin axis and are curved axially of the arms. Similarly, the arms 13 and 18 have inclined surfaces 52 and 53 which are inclined for contact with the conical surface of roller 27 and are curved axially of the arms. The axial curvatures of the surfaces control and obtain the constant velocity action through contact with the under surface of the conical rollers.

The surfaces 50 and 52 on yoke element 11 are curved axially of the axis of shaft element 10 with curvatures corresponding respectively to portions $R_2R_1$ of the two Archimedes spirals M, $M_1$ shown in Figure 4. This means that each of the surfaces comprises a serial of progressively larger spirals so as to form the full inclined surface and that along any axial section, the curve at the section line will correspond to a spiral. Similarly, the surfaces 51 and 53 on arms 19 and 18 of yoke element 17 are curved axially in accordance with portions $S_2S_1$ of Archimedes spirals N, $N_1$. The spirals M, $M_1$ are centered at O, while the spirals N, $N_1$ are centered at the point $O_2$ with such centers equally spaced from the joint center O. These centers are on the axis of shaft elements 10 and 16, respectively, and hence during any angling of either shaft about the joint center O, the center of the spiral shifts also about the joint center O.

If the shaft 10 is swung through the angle $\phi$, the spirals M and $M_1$ swing also through that angle to the dotted line positions shown. The intersections A and $A_1$ of the spirals which were on a normal to the shaft axes when the latter were aligned, now shift to points C and B, but the line $CB_1$ has only shifted through half the angle $\phi$. Rollers in contact with the spiral surfaces hence will shift through half the shaft angle and accordingly the axis of the driving pin will shift from $AA_1$ to $CB_1$ and will bisect the shaft angle so as to obtain constant velocity.

A more complete and detailed description of the manner in which the pin axis is shifted into the angle bisecting position may be found in the co-pending case identified, and attention is directed to that case accordingly. It may be observed generally, however, that other spirals or curved surfaces may be used in place of the particular spiral mentioned and that each conical roller will not contact the surfaces on the line of bisection, but will contact such surfaces at points spaced substantially equally from the line of bisection.

It will be appreciated in the joint described that the surfaces 50, 51, 52, and 53 are so related that the arms on the yoke elements can not be pulled axially apart owing to the spiral surface on each arm rising beyond the roller. In other words, to pull either shaft element axially from the other would require that the rising end of the curved surface be pulled under the conical roller surface. Axial movement of the shaft elements in the other direction is prevented by bearing elements 72 and 73 which are located respectively in openings 74 and 75 extending through the arms 20 and 14. The bearing elements 72 and 73 have cylindrical seats 76 and 77 substantially fitting the central portion of the pin, and such bearing elements may turn in the openings 74 and 75 about their own axis as may be required. For holding the bearing elements positioned, plugs 79 and 80 are threaded into the outer ends of the openings 74 and 75.

These bearing elements and the curved surfaces 50, 51, 52, and 53 co-operating with the conical rollers on the pin act to center the parts at a joint center O in Fig. 4 about which all pivotal movement occurs. Additionally, the shaft elements have spherical interfitting casing elements 70 and 71 movable one within the other and centered at O with the element 71 including a separable part 72 for permitting assembly. These casing elements act also to locate the joint center and provide a grease or lubricant container for lubricating the joint.

In another form of the invention shown by Fig. 5, the spirally curved surfaces are reversed so that surfaces 50 and 52, instead of being on arms 12 and 13, are on arms 19 and 18, and surfaces 51 and 53 are on arms 12 and 13. In other words, the surfaces on arms 12 and 13 correspond to spiral portions $S_2S_1$ while the surfaces on arms 19 and 18 correspond to spiral portions $R_2R_1$. With the surfaces so arranged, pulling apart of the arms axially is not prevented by such surfaces, and accordingly axial assembly and disassembly of the pin rollers and arms is permitted. This enables making the pin and rollers integral as shown so that the joint proper requires only three pieces, namely, the two yoke elements and the pin.

In centering the joint O it will be first seen that the spiral surfaces prevent movement of the arms axially inward past the position where they are in contact with the conical surfaces. Movement of the arms axially apart may be accomplished by using housing elements such as the elements 70 and 71 in Fig. 1. In this case the bearing elements 72 and 73 are eliminated, and this enables attaining a stronger third yoke arm and a greater length of direct load contact between the arm and pin.

While more than one form of the invention has been illustrated and described in detail, it will be apparent to those skilled in the art that various modifications may be made without departing from the scope of the appended claims.

What is claimed is:

1. A constant velocity universal joint comprising a pair of shaft elements, a diametrically extending pin, a pair of axial arms on one element extending past the pin at one side and substantially contacting the pin adjacent its ends respectively, a third axial arm on the one element and extending past the pin at the opposite side and substantially contacting it intermediate its ends, a second pair of arms on the other element and extending past the pin at said opposite side and substantially contacting the pin adjacent its ends, and a third arm on said other element extending past said one side of the pin and substantially contacting it intermediate its ends, and means at the outer ends of the pin for moving it into a position where its axis substantially bisects the angle between the shafts when either shaft is angled relative to the other.

2. A constant velocity universal joint comprising a pair of shaft elements, a diametrically extending pin, a pair of axial arms on one element extending past the pin at one side and substantially contacting the pin adjacent its ends respectively, a third axial arm on the one element and extending past the pin at the opposite side and substantially contacting it intermediate its ends, a second pair of arms on the other element and extending past the pin at said opposite side and substantially contacting the pin adjacent its ends, and a third arm on said other element extending past said one side of the pin and substantially contacting it intermediate its ends, and means at the outer ends of the pin for moving it into a position where its axis substantially bisects the angle between the shafts when either shaft is angled relative to the other, said means comprising curved surfaces on the arms at each end of the pin and overhanging surfaces on the pin engaging the curved surfaces.

3. A constant velocity joint comprising a pair of shaft elements, a diametrically extending pin having frusto-conical collars on its ends, a pair of axial arms on one element extending past the pin at one side and substantially contacting the pin adjacent its ends, said arms having surfaces inclined to the pin axis and curved longitudinally of the arms and contacting the collar, a third axial arm on the one element and extending past the pin at the opposite side and substantially contacting it intermediate its ends, a second pair of arms on the other element and extending past the pin at said opposite side and substantially contacting the pin adjacent its ends, said second pair of arms having surfaces inclined to the pin axis and curved longitudinally of the arms and contacting the frusto-conical surface of the collar, and a third axial arm on said other element and extending past the pin at said one side and substantially contacting it intermediate its ends.

4. A constant velocity joint comprising a pair of shaft elements, a diametrically extending pin having frusto-conical collars on its ends, a pair of axial arms on one element extending past the pin at one side and substantially contacting the pin adjacent its ends, said arms having surfaces inclined to the pin axis and curved longitudinally of the arms and contacting the collars, a third axial arm on the one element and extending past the pin at the opposite side and substantially contacting it intermediate its ends, a second pair of arms on the other element and extending past the pin at said opposite side and substantially contacting the pin adjacent its ends, said second pair of arms having surfaces inclined to the pin axis and curved longitudinally of the arms and contacting the frusto-conical surface of the collars, and a third axial arm on said other element and extending past the pin at said one side and substantially contacting it intermediate its ends, the curved surfaces on the arms of one element being substantially centered at a point spaced from and at one side of the pin axis and the curved surfaces on the arms of the other element being centered at a point spaced from the pin axis but at the side opposite the first center

RICHARD B. RANSOM.